US006507161B2

(12) United States Patent
Fair

(10) Patent No.: US 6,507,161 B2
(45) Date of Patent: Jan. 14, 2003

(54) CENTRIFUGE MOTOR CONTROL

(75) Inventor: Roger Glen Fair, Fairfield, OH (US)

(73) Assignee: The Western States Machine Company, Hamilton, OH (US)

( * ) Notice: Subject to any disclaimer, the term of this patent is extended or adjusted under 35 U.S.C. 154(b) by 0 days.

(21) Appl. No.: 09/822,593

(22) Filed: Mar. 30, 2001

(65) Prior Publication Data

US 2002/0000781 A1 Jan. 3, 2002

Related U.S. Application Data

(60) Provisional application No. 60/197,240, filed on Apr. 14, 2000.

(51) Int. Cl.[7] .................................................. H02P 3/18

(52) U.S. Cl. ....................... 318/375; 318/376; 318/700; 318/729; 318/799; 318/800; 318/802; 318/803; 210/360.1; 210/380.1; 494/7; 494/8; 494/9

(58) Field of Search ................................ 318/375, 376, 318/700, 729, 800, 802, 803, 799; 210/360.1, 380.1; 494/7, 8, 9

(56) References Cited

U.S. PATENT DOCUMENTS

| | | | | | |
|---|---|---|---|---|---|
| 2,427,101 | A | * | 9/1947 | Kochli | |
| 2,551,838 | A | | 5/1951 | Huser et al. | |
| 2,752,044 | A | | 6/1956 | Olcott | |
| 3,970,245 | A | * | 7/1976 | Aeschlimann | 233/24 |
| 4,132,349 | A | * | 1/1979 | Khoja et al. | 233/25 |
| 4,224,558 | A | | 9/1980 | Hays | |
| 4,450,391 | A | * | 5/1984 | Hara | 318/313 |
| 4,464,161 | A | * | 8/1984 | Uchida et al. | 494/7 |
| 4,482,853 | A | * | 11/1984 | Bhavsar | 318/778 |
| 4,700,117 | A | * | 10/1987 | Giebeler et al. | 318/327 |
| 4,752,283 | A | * | 6/1988 | Copeland et al. | 494/37 |
| 4,903,191 | A | | 2/1990 | Fries | |
| 4,994,725 | A | * | 2/1991 | Gschlossl | 318/727 |
| 5,203,762 | A | | 4/1993 | Cooperstein | |
| 5,254,241 | A | * | 10/1993 | Bange et al. | 210/86 |
| 5,485,066 | A | * | 1/1996 | Zeigler | 318/375 |
| 5,608,301 | A | | 3/1997 | Inaniwa et al. | |
| 5,726,550 | A | | 3/1998 | Inaniwa et al. | |
| 5,731,681 | A | | 3/1998 | Inaniwa et al. | |
| 5,857,955 | A | | 1/1999 | Phillips et al. | |
| 5,897,786 | A | * | 4/1999 | Henkel et al. | 210/744 |
| 5,905,348 | A | | 5/1999 | Nolan | |
| 5,919,123 | A | | 7/1999 | Phillips | |
| 6,063,292 | A | | 5/2000 | Leung | |
| 6,213,929 | B1 | * | 4/2001 | May | 494/24 |

FOREIGN PATENT DOCUMENTS

| | | | | |
|---|---|---|---|---|
| DE | SU 921008 B | * | 4/1982 | H02P/3/24 |
| DE | 2133233 | * | 7/1984 | H02P/3/12 |
| GB | 1055971 | * | 1/1967 | |
| GB | 2133233 A | | 7/1984 | |
| WO | WO 87/00770 | * | 2/1987 | B04B/9/10 |

OTHER PUBLICATIONS

Baldor Motors and Drives; Multipurpose Soft Starter Sizes 8 to 840 AMP; Instillation & Operating Manual; 9/99.

* cited by examiner

*Primary Examiner*—Robert E. Nappi
*Assistant Examiner*—Tyrone Smith
(74) *Attorney, Agent, or Firm*—Killworth, Gottman, Hagan & Schaeff, L.L.P.

(57) ABSTRACT

The present invention overcomes the disadvantages of previously known motor controllers for centrifuge machines wherein a motor controller is provided for a centrifuge machine including a logic control module, one or more power cells, and one or more contactors. The logic control module is capable of interfacing with the main centrifuge controller and provides control over the power cells and contactors to provide a voltage ramp-up to accelerate the centrifuge basket. As such, the logic control module avoids the current draining problems associated with across the line starting of the centrifuge motor. The power cells receive a voltage from the main power supply, and output to the contactors variable power to control centrifuge motor speed. Further, the configuration of multiple contactors to reverse the power supplied to the centrifuge motor windings may eliminate the need for a second, reverse direction motor.

39 Claims, 5 Drawing Sheets

CENTRIFUGE MOTOR CONTROL

CROSS-REFERENCE TO RELATED APPLICATIONS

This application claims the benefit of U.S. Provisional Application No. 60/197,240 filed Apr. 14, 2000 that is incorporated herein by reference.

BACKGROUND OF THE INVENTION

The present invention relates in general to heavy cyclical centrifugal machines and, more particularly, to an apparatus for controlling the speed and direction of a rotating centrifugal basket of the machine. While the present invention is generally applicable to heavy cyclical centrifugal machines, it will be described herein with reference to batch centrifugal machines used for manufacturing and refining sugar.

A centrifugal machine uses centrifugal force to separate substances, such as, for example a liquid component (the filtrate) from a solid component (the cake), in a slurry which has been introduced to the centrifugal machine. A filtering perforate wall traps the cake by a filter, whereas the filtrate passes through the filter.

A problem encountered when operating heavy cyclical centrifugal machines of the type used to manufacture and refine sugar is the inaccurate control of the speed of rotation of centrifugal baskets of the machines. These baskets should be fully loaded to their maximum capacities to maximize the productivity of the machines. Unfortunately, should the rotation of the centrifugal basket inadequately dispel the filtrate, the cake may be compromised. Variations in the loading properties of the charge material, massecuite for sugar manufacture and refining, can affect the efficiency of cycle to cycle centrifugal processing. Since these variations in loading properties are difficult or impossible to control, it has been an ongoing goal in the industry to control the motor operations of centrifugal machines such that the machines may be loaded with maximum charge in spite of the charge material variations.

The operational speeds of a heavy cyclical centrifugal machines are known to be established through the use of 2-speed motors, which utilize a dual set of internal windings such that the motor may operate at either a low or a high speed. However, a portion of a typical centrifugal machine cycle may require the rotational speed of the basket to be maintained at some intermediate value on the low speed windings. One known method of accomplishing this task is to repeatedly open and close a set of electrical contacts that energize and de-energize the low speed windings. This causes wear on the electrical components and may require frequent maintenance.

Further, it is a practice to reverse the direction of rotation of the centrifugal machine basket while discharging the charge material from the centrifugal machine basket. This is typically implemented by mechanically braking the rotation of the centrifugal machine basket until the centrifugal machine basket is at rest. The main 2-speed motor is electrically disengaged, and a second motor is engaged to rotate the centrifugal machine basket in the reverse direction. Upon completion of the discharge phase of the centrifugal machine cycle, the second motor disengages and the 2-speed motor re-engages to start a new cycle. Thus, the cost of the centrifugal machine is increased, and the motor control circuitry is complicated by the need to switch between multiple motors during each cycle.

Additionally, peak power demands, which occur typically during accelerating the centrifugal basket, can cause considerable power drain. This is because engaging the 2-speed motor low or high speed windings amounts to "across-the-line" starting of the motor. This has the effect of huge current demand on the electrical transformer during motor acceleration. The power drawn during operation affects the refiners ability to process sugar cost efficiently.

Accordingly, there is a need for an improved motor control for a centrifugal machine that eliminates the need for a second motor for operating the basket is a reverse direction, and reduces the peak power drawn by the centrifugal machine.

SUMMARY OF THE INVENTION

The present invention overcomes the disadvantages of previously known motor controllers for centrifuge machines wherein a motor controller is provided for a centrifuge machine including a logic control module, one or more power cells, and one or more contactors. The logic control module is capable of interfacing with the main centrifuge controller and provides control over the power cells and contactors to provide a voltage ramp-up to accelerate the centrifuge basket. As such, the logic control module avoids the current draining problems associated with across the line starting of the centrifuge motor. The power cells receive a voltage from the main power supply, and output to the contactors variable power to control centrifuge motor speed. Further, the configuration of multiple contactors to reverse the power supplied to the centrifuge motor windings may eliminate the need for a second, reverse direction motor.

In accordance with one embodiment of the present invention, a motor controller for a centrifuge machine comprises a first power cell having an input coupled to a main power supply, and an output. The first power cell is switchable between an on state where power is supplied to the output, and an off state where no power is supplied to the output. The motor controller also comprises a first contactor connected between the output of the first power cell and first windings of a motor. The first contactor is switchable between a first state, wherein an electrical connection is made between the first power cell and the motor, and a second state wherein an electrical connection is broken between the first power cell and the motor. Additionally, the motor controller comprises a logic control module coupled to the first power cell and the first contactor. The logic control module is arranged to interface with the controls of the centrifuge machine to selectively apply and vary power to the motor. Power is supplied to the motor when the logic control module switches the first contactor to the first state to establish an electrical connection between the first power cell and the motor. The logic control module further communicates with the first power cell to vary the power output by the first power cell, and accordingly adjusts the power to the motor thereby controlling the rotation of the centrifuge. For example, where the first power cell is implemented as a pair of silicon controlled rectifiers (SCRs), the logic control module controls the amount of power the first power cell supplies to the motor by varying the rate at which the logic control module turns the first power on and off.

When used with certain heavy duty cylindrical centrifugal machines, three phase AC power may be required to power the motor. Under such circumstances, the motor controller further comprises second and third power cells. The power supply comprises a three phase power supply and each of the first, second and third power cells couple a respective phase of the three phase power supply to the first contactor.

Further, more elaborate motor control schemes may be realized by incorporating into the motor controller a second contactor connected between the first power cell and second windings of the motor. The second contactor is switchable between a first state, wherein an electrical connection is made between the first power cell and the motor, and a second state wherein an electrical connection is broken between the first power cell and the motor. The second contactor is coupled to the logic control module. The logic control module is further arranged to control the first and second contactors for selectively supplying power to the first and second windings of the motor. For example, the motor may be a 2-speed motor having first windings, which are low speed windings connected to the first contactor. The second windings may be high speed windings connected to the second contactor. The logic control module is arranged to switch both the first and second contactors into their respective second states, thus the motor controller supplies no power to the motor. By maintaining the second contactor in the second state, and turning the first contactor to the first state, the power cell is coupled to the first (low speed) motor windings, and isolated from the high speed windings. The logic control module may control the speed of the motor by varying the power delivered to the low speed windings via the power cell. In contrast, where high speeds of centrifuge rotation are required, the logic control module switches the first contactor to the second state isolating the low speed windings from the power cell, and transitions the second contactor to the first state, thereby coupling the power cell to the high speed motor windings. The logic control module may optionally switch off the power cell prior to changing the state of either the first or second contactors to avoid switching the contactors while energized.

A third contactor may optionally be connected between the first power cell and the first windings of the motor, the third contactor is switchable between a first state, wherein an electrical connection is made between the first power cell and the motor, and a second state wherein an electrical connection is broken between the first power cell and the motor, the second contactor coupled to the logic control module. The third contactor is wired in parallel with the first contactor and arranged to supply power to the motor such that the motor rotates in a direction opposite of the direction the motor rotates when powered through the first contactor.

Further, the motor controller incorporates the first power cell to adjust the power delivered to the motor while accelerating the motor. The main power supply may supply power to the motor while the motor is rotating at full speed, or alternatively, the motor control may utilize the power cell to power the motor throughout the entire centrifuge cycle.

To more accurately control the motor, the motor controller may optionally include a speed determinative device connected to a first input of the logic control module. The speed determinative device may be a tachometer for example. When using a speed sensing device such as a tachometer, sophisticated programming of the motor controller may be realized. For example, a predetermined speed band may be programmed into the logic control module. During at least a portion of a cycle of operation, the motor speed may be adjusted so that the rotation of the centrifuge is maintained within the speed band. For example, during loading, it the rotation may be maintained at a speed suitable to centrifuge the material being processed.

Additionally, the motor controller may include a voltage suppression device arranged to prevent voltage spikes from reaching the first power cell. For example, a varistor may be used to absorb voltage spikes and transients. Likewise, a current sensing device such as a transformer may be connected to the logic control module to monitor current draw by the motor.

In accordance with another embodiment of the present invention, a centrifuge comprises a basket arranged to receive materials for processing. A motor interconnects to the basket to provide basket rotation in both a forward and reverse direction. A motor controller is coupled to the motor for providing control of the motor, including direction of rotation and rotational speed. The motor controller comprises at least one power cell coupled to a main power supply arranged to control a voltage applied to the motor. The voltage adjusts the rotational speed of the motor. A first contactor couples the power cell to the motor. The first contactor is switchable between a first state wherein an electrical connection is made between the power cell and the motor, and a second state wherein an electrical connection is broken between the at power cell and the motor. A logic control module is coupled to the power cell and the first contactor. The logic control module is arranged to selectively apply and vary power to the motor. For heavy duty cyclical centrifuges, the voltage is a three phase voltage. The motor controller further comprises three power cells, one power cell arranged to control an associated one phase of the three phase voltage.

The motor controller communicates with the power cell to produce a voltage ramp-up to accelerate the basket. The motor controller adjusts the speed of rotation of the basket by selectively turning on and off the power cell. To better adjust the speed of the basket, the motor controller may optionally include a speed determining device coupled to the logic control module. For example, the speed determining device may comprise a tachometer. The tachometer utilizes for example, a magnetic pickup positioned to sense the speed and direction of a toothed gear mounted on a shaft of the motor. The tachometer sends speed control data to a tachometer control unit, the tachometer control unit forwards the information to the logic control module.

The motor controller further comprises a second contactor coupling the power cell to the motor. The second contactor is switchable between a first state wherein an electrical connection is made between the at least one power cell and the motor, and a second state wherein an electrical connection is broken between the at least one power cell and the motor. The second contactor is arranged such that, when the voltage is applied to the motor through the second contactor, the rotation of the motor is opposite the rotation of the motor when the voltage is applied to the motor through the first contactor.

The motor controller may further include a third contactor coupling the power cell to the motor. The third contactor is switchable between a first state wherein an electrical connection is made between the at least one power cell and the motor, and a second state wherein an electrical connection is broken between the at least one power cell and the motor. The motor comprises high speed windings and low speed windings, the first contactor is connected to the low speed windings and the second contactor is connected to the high speed windings.

Additionally, the motor controller may include a voltage suppression device arranged to prevent voltage spikes from reaching the first power cell. For example, a varistor may be used to absorb voltage spikes and transients. Likewise, a current sensing device such as a transformer may be connected to the logic control module to monitor current draw by the motor.

According to yet another embodiment of the present invention, a motor controller for controlling a three phase, 2-speed AC motor comprises three power cells, each of the three power cells connected to a different one phase of a three phase power supply. A first contactor is connected between each of the three power cells and first windings of the 2-speed AC motor, and is arranged to bias the 2-speed AC motor to operate in a first direction. The first contactor is switchable between a first state wherein an electrical connection is made between the at three power cells and the 2-speed AC motor, and a second state wherein an electrical connection is broken between the three power cells and the 2-speed AC motor. A second contactor is connected between each of the three power cells and the first windings of the 2-speed AC motor, in parallel with the first contactor. The second contactor is switchable between a first state wherein an electrical connection is made between the at three power cells and the 2-speed AC motor, and a second state wherein an electrical connection is broken between the three power cells and the 2-speed AC motor. The second contactor is arranged to bias the 2-speed AC motor to operate in a second direction. A third contactor is connected between each of the three power cells and second windings of the 2-speed AC motor. The third contactor is switchable between a first state wherein an electrical connection is made between the at three power cells and the 2-speed AC motor, and a second state wherein an electrical connection is broken between the three power cells and the 2-speed AC motor. The third contactor is arranged to bias the 2-speed AC motor to operate in the first direction on the high speed windings. A logic control module is connected to the three power cells and the first, second and third contactors, arranged to control the amount of power the three power cells supply to the motor. A speed determining device is coupled to the logic control module, the speed determining device arranged to provide data concerning the rotational speed of the 2-speed AC motor to the logic control module.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that logical, mechanical and electrical changes may be made without departing from the spirit and scope of the present invention.

Figure 1:
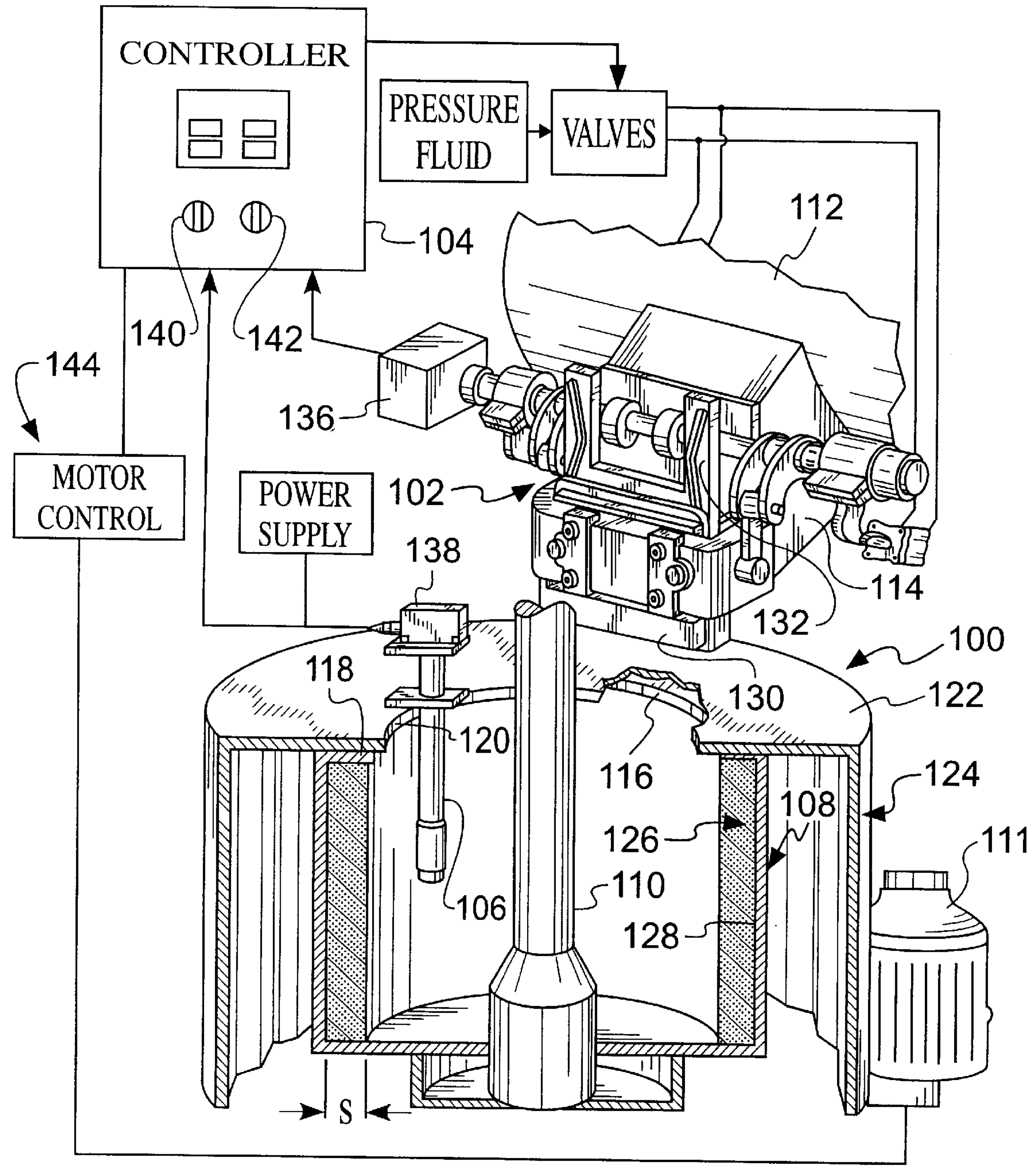
FIG. 1 is a partially sectioned, perspective schematic view of portions of a cyclic centrifugal machine to schematically illustrate apparatus operable in accordance with the present invention.

FIG. 1 schematically illustrates several features of a heavy cyclical centrifugal machine 100. A loading gate assembly 102 cooperates with a loading controller 104 to allow a slurry to enter the centrifugal machine 100. The loading gate assembly 102 and loading controller 104 receive signals generated by an ultrasonic probe 106 or other means for linearly measuring a charge wall as it builds up in the centrifugal machine 100. A variety of valve constructions can be used in the present invention as the loading or infeed gate including, for example, knife valves, butterfly valves, and other appropriate valves as will be apparent to those skilled in the art. Further, while the centrifugal machine 100 is shown with an ultrasonic probe 106, other sensors may be used, including capacitive sensors or mechanical (feeler)-style cake sensors (not shown).

The centrifugal machine 100 includes a perforated cylindrical basket 108 carried on a spindle 110 that is suspended from a gyratory head (not shown) and is rotated in a conventional manner by a 2-speed motor 111. For example, the 2-speed motor 111 may be an inverter duty AC motor suitable for use with three phase power sources. The 2-speed motor includes two sets of windings, a first set of windings for low velocity, for example, up to 600 r.p.m., and a second set of windings for high velocity, for example, up to 1200 r.p.m. The spindle 110 and basket 108 are driven at high centrifuging speeds for processing a load of charge material in the basket 108 and at lower speeds during other operating phases of cyclic machine operation, including loading and discharging phases.

Charge material is delivered into the basket 108, from a storage or supply tank 112 through operation of the loading gate assembly 102. For example, the charge material may be massecuite for sugar manufacture and refining. The loading gate assembly 102 is mounted at the mouth of a spout 114 extending from the tank 112. The charge material flowing from the loading gate assembly 102 passes into the basket 108 through a central opening 116 in a top 118 of the basket 108 reaching the basket 108 through a central opening 120 in a top 122 of a cylindrical curb structure including an outer wall 124 which surrounds the basket 108.

Figure 2:
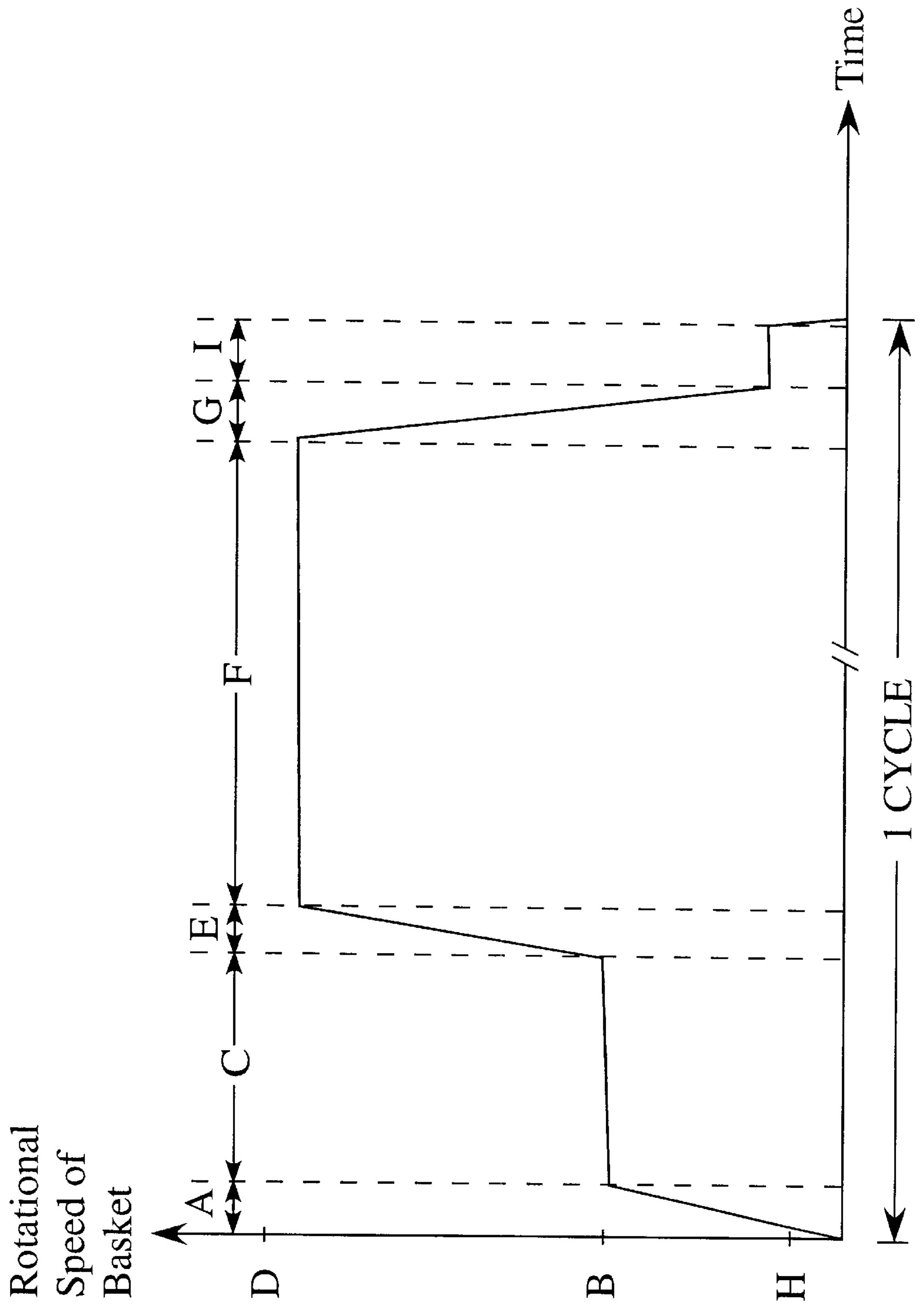
FIG. 2 is a graph illustrating a theoretical plot of revolution speed of a centrifugal machine basket versus time.

The operation of the above described centrifugal machine 100 will now be described by reference to FIGS. 1 and 2. FIG. 1 illustrates components of the centrifugal machine 100 while FIG. 2 illustrates timing of events and rotation of the cylindrical basket 108 for one complete cycle. Referring to FIG. 2, the centrifugal machine 100 is accelerated through time A, to a predetermined rotational velocity B, and the centrifugal machine 100 is held at velocity B while the cylindrical basket 108 is loaded. Referring back to FIG. 1, the charge material is made up of both cake and filtrate components and is delivered into the cylindrical basket 108 while the cylindrical basket 108 is rotating. The velocity B is a predetermined speed suitable for forming a charge wall 126. The charge wall 126 is formed in a charge space S along an inner sidewall 128 of the cylindrical basket 108 by centrifugal force. As centrifugal force drives the mother liquor through the deposited cake, filter media and inner sidewall 128 of the perforated cylindrical basket 108, a cake of charge material builds up on the filter media wall. (The filter media is not shown). The rotational velocity B of the loading process may be 40% to 60% of full speed.

The controller 104 receives input signals from an encoder 136 and from probe control circuitry within a probe control circuit housing 138 (alternately, the probe control circuitry can be housed within the controller 104) of the ultrasonic probe 106 and also from operator settable controls 140, 142 associated with the controller 104. An operator of the centrifugal machine 100 can set an appropriate final thickness for the charge wall 126 to be loaded into the machine 100 by the settable control 140.

In response to signals from the probe control circuitry within the housing 138 and the gate member position signal, the loading controller 104 controls the movable gate member 130. The loading controller 104 may be embodied in a programmable logic control module (PLC) or in one of a large variety of commercially available microprocessors. Referring to FIG. 2, the loading process continues for a duration designated by reference to time period C.

Due to varying crystal sizes and different solid/liquid ratios from one batch of massecuite to the next, purge rates vary. Therefore, the amount of solids and the thickness of the charge wall or cake at process revolution speed will vary also. Because a portion of the cake is dissolved by the wash, the amount of wash time is set at an optimum level to perform the purge. Excessive wash time merely wastes product however. Accordingly, the controller 104 thus automatically adjusts for different amounts the cake settles during centrifugal machine 100 processing.

After the charge wall reaches a desired thickness, the centrifugal machine 100 is further accelerated to velocity D, over time period E. Velocity D may be full speed for the centrifugal machine 100 for example. At full speed, or velocity D, the cake is washed, and dried over time period F. It should be appreciated that the wash cycle may actually start prior to completing the acceleration of the centrifugal basket 108 to full speed, or velocity D. The retained solids are accelerated to spin drying speed (corresponding to duration F). After spin drying, the centrifugal machine 100 decelerates to discharge speed and the discharger removes the material from the centrifugal basket 108. Alternatively, the material may removed by lifting the top of the centrifugal machine 100 an removing the product in a filter bag (Not shown). Referring to FIG. 2, the centrifugal machine 100 is decelerated during time period G to velocity H where the charge material is removed from the centrifugal machine 100 during time period 1. It should be observed that the cycle times may vary from a few minutes up to one half of an hour or more. Further, the time periods required for the phases of loading, drying and discharging may vary. As such, the graph in FIG. 2 is not necessarily drawn to scale in terms of either relative rotational velocity, or in terms of relative time periods between respective phases.

Referring back to FIG. 1, the loading controller 104 may be a computer, including a general purpose computer, or a specialized computer-type of processing unit. For example, a central processing unit (CPU), in conjunction with, or in lieu of a programmable logic control (PLC) may be used. Further, motor controller 144 communicates with the loading controller 104 and the 2-speed motor 111 to provide an intelligent system to control the operation of the 2-speed motor 111. By intelligent system, it is meant that the motor controller 144 may be implemented by neural networks, logic, fuzzy logic, expert systems, statistical analysis, signal processing, pattern recognition, categorical analysis, any combination thereof, or any combination of known processing techniques.

Figure 3:
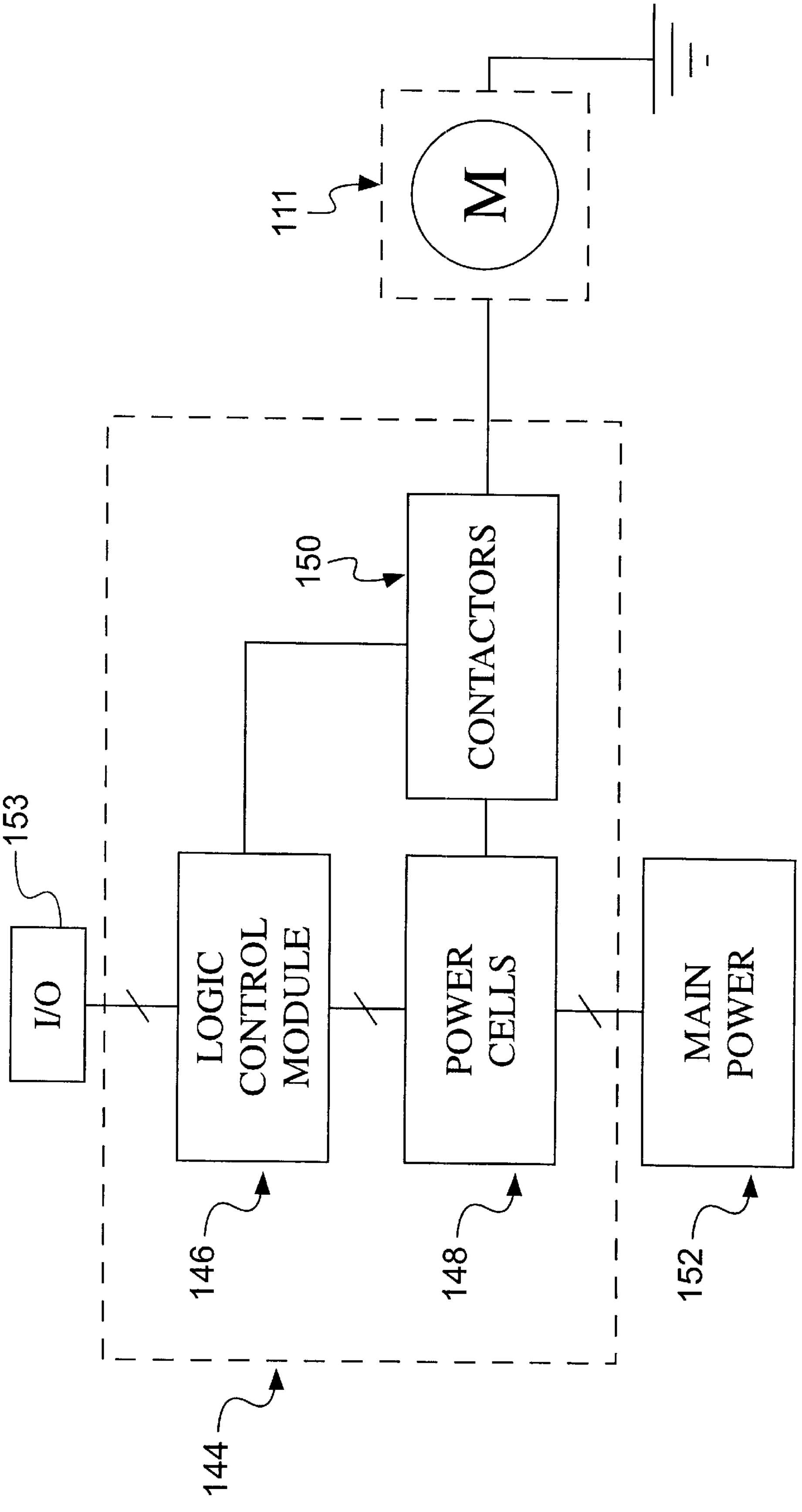
FIG. 3 is a block diagram of the centrifugal machine motor control according to the present invention; and, FIG. 4 is a schematic illustration of the centrifugal machine motor control of FIG. 3; and, FIG. 5 is a graph of a typical plot of revolution speed of a centrifugal machine basket versus time.

As shown in FIG. 3, the motor controller 144 is comprised of a logic control module 146, power cells 148 and contactors 150. The logic control module 146 receives information from input/output (I/O) devices, and relies on internal processing to control the power cells 148 and the contactors 150. The main power 152 passes through the power cells 148, to the contactors 150, and on to the 2-speed motor 111. The power cells 148 condition the main power 152 as more fully explained herein, so that the 2-speed motor 111 can be efficiently controlled. Further, the contactors 150 act as switches to determine which of the windings the are energized by the power cells 148.

Figure 4:
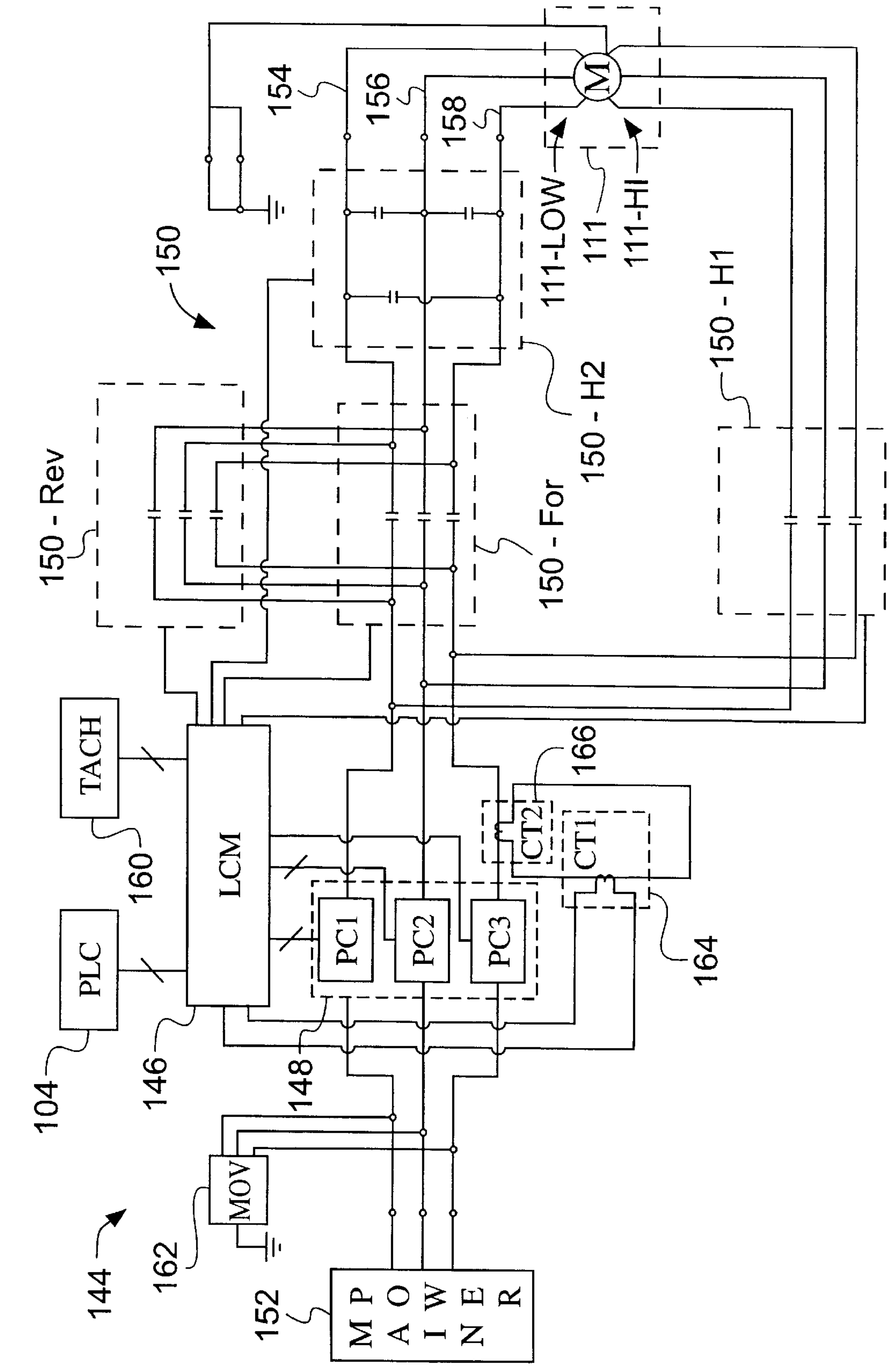

As shown in FIG. 4, a motor controller 144 is schematically illustrated. The logic control module 146 monitors the voltage and current levels being supplied to the 2-speed motor 111 and directly controls the power cells 148. Further, the logic control module 146 communicates with other controllers, such as the loading controller 104, and further obtains information from I/O devices such as speed sensing device 160 as more fully explained herein. The logic control module 146 cooperates with the power cells 148 to produce a voltage ramp-up during acceleration that provides a smooth start and eases transients on the incoming power from the main power system 152. It should be appreciated that, while illustrated in FIG. 4 as a dedicated integrated circuit chip, the logic control module 146 may be implemented as a circuit of discrete components, a general purpose computer, or a specialized computer-type of processing unit.

The power cells 148 control the voltage being supplied to the 2-speed motor 111 during acceleration and deceleration operations, thus providing a ramping action. There are three power cells (PC1, PC2, and PC3) as illustrated in FIG. 4, one for each phase of the AC main power supply 152. Each power cell PC1, PC2, and PC3 consists of two silicon controlled rectifiers (SCR's). The SCR's (not shown) are solid state switches able to control large amounts of current flow and function to limit the amount of voltage or current being supplied to the 2-speed motor 111 by turning on and off in rapid succession. Six SCR devices connect in three sets of inverse parallel configuration to provide full wave voltage and current control for the 2-speed motor 111. While illustrated in FIG. 4 with three power cells 148, it is to be understood that any number of power cells may be implemented. Additionally, devices and structures other than the use of SCR's may be realized. Further, while not shown in FIG. 4, it is to be understood that additional components such as heat sinks, cooling fans and the like may be required.

The contactors 150 route the output voltage of the power cells 148 to the low or high speed motor windings of the 2-speed motor 111, and further serve to reverse the direction of the 2-speed motor 111 for discharge operations. The logic control module 146 ensures that the power cells 148 are off during actual contactor cycling. This prevents the contactors 150 from being opened or closed while energized and under load. As illustrated in FIG. 4, the contactors 150 include a forward contactor 150-FOR, a reverse contactor 150-REV, a first high speed winding contactor 150-H1, and a second high speed winding contactor 150-H2.

During initial acceleration of the centrifugal machine 100, and during basket loading operations, the logic control module 146 turns on the forward contactor 150-FOR. The logic control module 146 turns off the reverse contactor 150-REV, as well as the high speed contactors 150-H1 and 150-H2. As such, the forward contactor 150-FOR couples the output of the power cells 148 to the low speed windings 111-LOW of the 2-speed motor 111. As illustrated in FIG. 4, when the 2-speed motor 111 is operating in the forward direction, the output of PC1 is coupled to the low speed windings 111-LOW of the 2-speed motor 111 along connection 154. The output of PC2 is coupled to the speed windings 111-LOW of the 2-speed motor 111 along connection 156, and the output of PC3 is coupled to the low speed windings 111-LOW of the 2-speed motor 111 along connection 158.

When the centrifugal machine 100 ramps up to full speed for the drying phase of the cycle, the logic control module 146 turns off the forward contactor 150-FOR, and turns on the high speed forward contactors 150-H1 and 150-H2. The low speed reverse contactor 150-REV remains off during this phase of the cycle. The high speed forward contactor 150-H1 couples the output of the power cells 148 to the high speed windings 111-H1 of the 2-speed motor 111. Both the low speed forward contactor 150-FOR, and the low speed reverse contactor 150-REV are off, creating an open circuit between the power cells 148 and the low speed windings 111-LOW of the 2-speed motor 111. The high speed contactor 150-H2 is turned on to tie together the low speed windings 111-LOW of the 2-speed motor 111. After the dry phase of the cycle, the centrifugal machine 100 is operated in a low speed, reverse direction phase of the cycle while the cake is discharged from the basket of the centrifugal machine 100. During this operation, the high speed contactors 150-H1 and 150-H2 are turned off, the low speed forward contactor 150-FOR remains off, and the low speed reverse contactor 150-REV is turned on. This couples the power cells 148 to the low speed windings 111-LOW of the 2-speed motor, and further biases the power supplied to the low speed windings 111-LOW to operate the 2-speed motor in the reverse direction. As illustrated in FIG. 4, when the logic control module 146 operates the 2-speed motor 111 in the reverse direction, the output of PC1 is coupled to the low speed windings 111-LOW along connection 156, and the output of PC2 is coupled to the low speed windings 111-LOW 111 along connection 154, while the output of PC3 continues to couple to the low speed windings 111-LOW along connection 158. While the operating direction of the 2-speed motor 111 as illustrated in FIG. 4, can be reversed by swapping the connections 154 and 156 on the low speed windings 111-LOW, it will be appreciated that other, or additional modifications may be required depending upon the motor actually used.

The contactors 150 may be electrical or mechanical contactors. Electrically held contactors require a continuous application of voltage to the holding coil (not shown) that maintains contact closure. These units are frequently used in applications where a high number of operations may be run, the contacts will open whenever the coil voltage is released. Electrical contactors are known to be used in centrifugal machines 100 to vary the power delivered to a motor. The contactor is switched on and off in rapid succession to vary the power delivered to the motor. The repeated switching wears out the solenoid, causing maintenance and frequent repairs.

Mechanical contactors use a momentary application of voltage to close or open main contacts. Since the contacts are held closed mechanically, the AC hum associated with holding coils is eliminated. Because the motor controller 144 relies on the power cells 148 to adjust the power delivered to the 2-speed motor 111, and not the contactors 150 of the present invention, the contactors 150 are not switched on and off in rapid succession, and as such, the contactors 150 may be mechanical or electrical.

To ensure that the centrifugal basket 108 (not shown in FIG. 4) rotates at the programmed rotational speed, the motor controller 144 further incorporates a speed sensing device. For example, a tachometer speed sensing device may be used. The tachometer includes a magnetic pickup (not shown) mounted to the 2-speed motor 111. The magnetic pickup senses the speed and direction of a rotating portion of the motor, such as a toothed gear (not shown) mounted on the motor shaft, and sends a speed signal to the tachometer control unit 160, which in turn provides various speed inputs to the logic control module 146. While the tachometer circuit is described as using a toothed gear, it should be appreciated that other suitable devices may be used. Split and solid gears as well as tachometer tape may suitably be used to determine rotational velocity. An example of a suitable tachometer is the Tach Pak 3—digital process tachometer provided by Airpax Instruments of Cheshire Connecticut.

The motor controller 144 further includes voltage surge suppression 162. For example, the voltage surge suppression may be implemented as a Metal Oxide Varistor. The voltage surge suppressor filters the voltage from the main power supply 152 that might otherwise damage to the motor controller 144 by clamping short duration, high voltage spikes.

Current monitoring devices are also utilized in the motor controller 144 to provide information to the logic control module 146. For example, the current monitoring devices may be implemented as current transformers 164, 166. The current transformers 164, 166 provide signals indicative of the current in the motor windings 111-LOW and 111-H1 for input to the logic control module 146.

Figure 5:
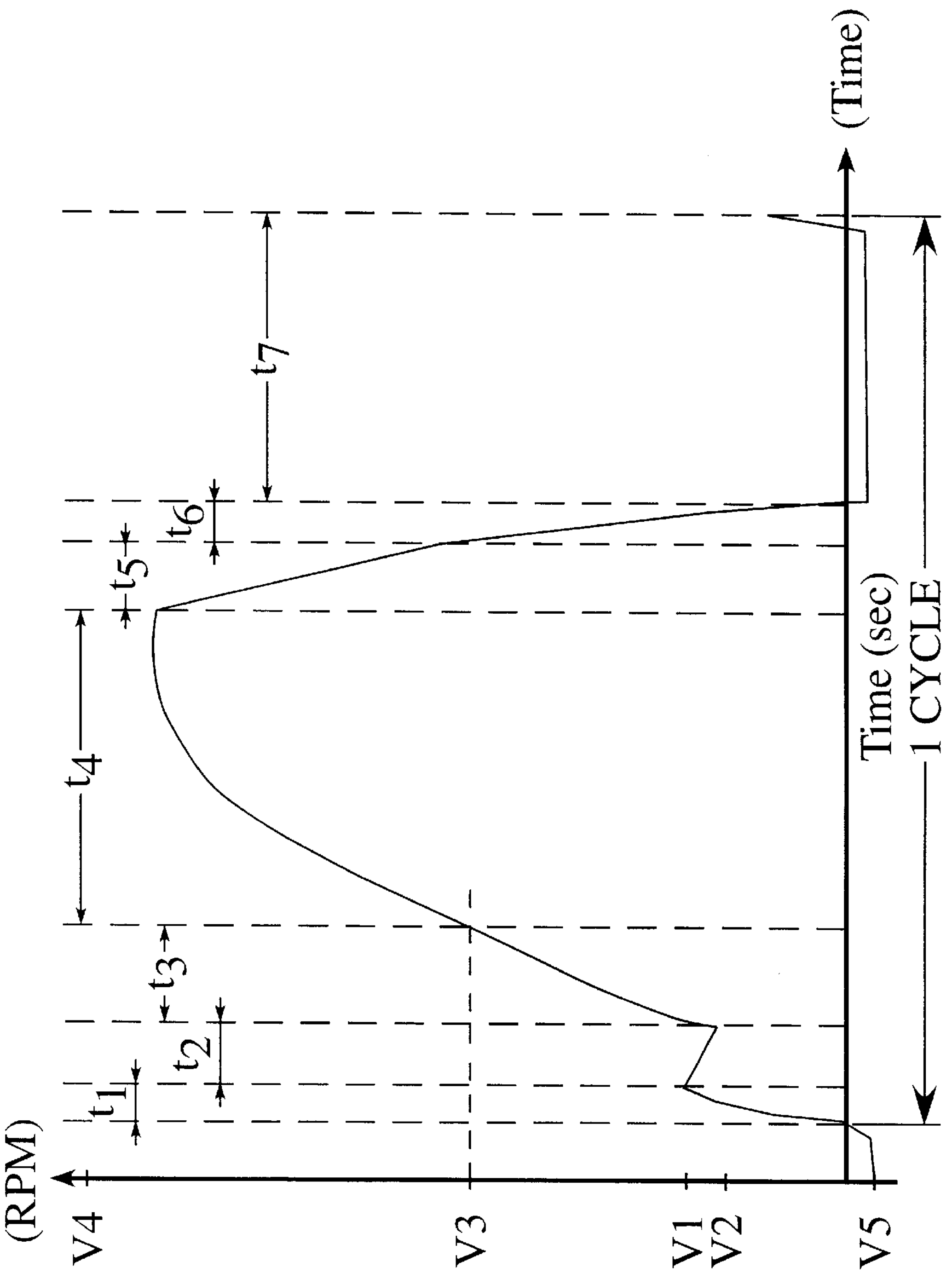

The operation of the above-described motor controller 144 will now be described by reference to FIGS. 4 and 5. FIG. 4 schematically illustrates components of the motor controller 144, while FIG. 5 illustrates timing of events and rotation of the cylindrical basket 108 for one complete cycle. Initially, the logic control module 146 sends a signal to the power cells 148 to produce voltage ramp-up to accelerate the 2-speed motor 111, such that the acceleration provides a smooth start and eases transients on the incoming power system. The logic control module 146 monitors the speed of rotation of the 2-speed motor 111 until a predetermined speed is reached. Referring to FIG. 5, acceleration occurs over a period T1 to a velocity of V1. For example, initially, over the course of about 5 seconds, the rotational velocity is increased from zero rpm to a relatively low loading speed of between about 200 rpm and about 300 rpm. Referring back to FIG. 4, if the 2-speed motor 111 is not adequately protected, the sudden change in rotation torque and speed that occurs on starting and stopping will jolt the equipment linked to it. Over the long-term this leads to increased mechanical wear. The logic control module 146 controls the voltage supplied to the 2-speed motor 111 during starting and stopping to ensure smooth acceleration and deceleration. The gradual supply of current to the 2-speed motor 111 also eliminates unwanted tripping, erratic current supply and motor overheating.

The loading controller 104 sends an input to the motor controller while the centrifugal machine 100 (not shown in FIGS. 4 and 5) is loaded. Referring to FIG. 5, loading occurs during time period T2. For example, once a loading speed of 250 r.p.m. to 300 r.p.m. is reached, a charge of material to be processed is loaded over the course of about 10 seconds. In operation, during the loading operation in time period T2, the velocity V1 may be maintained or alternatively, the actual velocity may vary. For example, the 2-speed motor 111 may be allowed to coast, or alternatively, the 2-speed motor 111 may be maintained within a predetermined speed band V1–V2. Referring to FIG. 4, to maintain a low speed for loading, the logic control module 146 turns the power cells 148 on and off based on maintaining the centrifugal machine 100 speed within a pre-selected velocity, or alternatively, within a predetermined speed band (V1–V2 as illustrated in FIG. 5). Precise speed is maintained without repeated cycling of the contactors 150 because the power cells 150 provide the power conditioning. The logic control module 146 monitors the voltage and current levels being supplied to the two-speed motor 111 through communication with the power cells 148, and the current monitoring devices 164, 166, and further obtains information from the speed sensing device 160 to determine suitable power to be supplied to the 2-speed motor 111 via the power cells 148.

Referring to FIG. 5, upon completion of the loading phase, the rotational velocity is increased for a drying phase of cyclical operation. The velocity increases over time period T3 to velocity V3, and over time period T4 to velocity V4. Following loading, the centrifugal machine 100 motor is accelerated over the course of about 70 seconds, to a relatively high rotational speed of about 1200 rpm. Referring to FIG. 4, as the velocity increases, eventually, the maximum rated rotational velocity of the low speed windings 111-LOW will be reached (illustrated in FIG. 5 as velocity V3). At that point, the logic control module 146 turns off the power cells 148, switches off the forward contactor 150-FOR, and turns on the high speed contactors 150-H1 and 150-H2. The power cells 148 are turned off to avoid switching the contactors 150 while energized. The power cells are turned back on to continue accelerating the 2-speed motor 111 with the high speed windings 111-H1 engaged. The logic control module 146 may control the 2-speed motor 111 when the 2-speed motor 111 is not operating at full speed. When operating at full speed, such as during the drying phase of a cycle, the 2-speed motor 111 is supplied directly from the main power supply 152. Alternatively, the logic control module 146 may keep control of the 2-speed motor 111 at all times.

Referring to FIG. 5, after completion of the drying phase of the cycle, the velocity is decelerated over time periods T5 and T6, until the rotational velocity is reversed. Operation is maintained at velocity V5 during the discharge phase. V5 is illustrated below the zero line to indicate that the rotational velocity is in the opposite direction as that used in the loading and drying phases. For example, following the drying phase, where the rotational velocity is around 1200 r.p.m., the rotational speed is decelerated and reversed over the course of about 20 seconds. The reverse drive of the motor is executed at a relatively low velocity, such as 50 r.p.m. It is contemplated by the present invention that the 2-speed motor 111 need not be reversed if an appropriate mechanical modification is made to the centrifugal basket 108 (not shown in FIG. 4) to allow for charge unloading in the forward direction. Following charge removal, the 2-speed motor 111 is accelerated to the loading speed and the process is repeated.

Referring to FIG. 4, the motor controller 144 has the benefit of more precise control on the 2-speed motor 111, and thus the power demand on the user's electrical transformer. In prior centrifugal machines, engaging the low speed or high speed windings of the motor amounted to "across-the-line" starting of the motor. This has the effect of large current demand on the electrical transformer of the main power supply during motor acceleration. The motor controller 144 eases these peak electrical demands on the transformer by providing ramping action through the control of the power cells 148.

Having described the invention in detail and by reference to preferred embodiments thereof, it will be apparent that modifications and variations are possible without departing from the scope of the invention defined in the appended claims. For example, the present invention is not limited to the specific rpm and timing ranges noted herein and it is contemplated that a variety of suitable rpm and timing values may be effective in the motor control scheme of the present invention.

What is claimed is:

1. A centrifuge comprising:

a basket arranged to receive materials;

a motor interconnected to said basket; and, a motor controller coupled to said motor, said motor controller comprising:

at least one power cell coupled to a main power supply and arranged to control a voltage applied to said motor, wherein said voltage adjusts the rotational speed of said motor, a first contactor coupling said at least one power cell to said motor, said first contactor switchable between a first state wherein an electrical connection is made between said at least one power cell and said motor, and a second state wherein an electrical connection is broken between said at least one power cell and said motor, and, a logic control module coupled to both said at least one power cell and said first contactor, said logic control module arranged to control said at least one power cell and said first contactor to selectively apply power to said motor during at least acceleration operations of said motor.

2. A centrifuge according to claim 1, wherein said voltage is a three phase voltage, and said motor controller further comprises three power cells, one power cell arranged to control an associated one phase of said three phase voltage.

3. A centrifuge according to claim 1, wherein said power cells comprise silicone controlled rectifiers.

4. A centrifuge according to claim 1, wherein said motor controller communicates with said at least one power cell to produce a voltage ramp-up to accelerate said basket.

5. A centrifuge according to claim 1, wherein said motor controller adjusts the speed of rotation of said basket by selectively turning on and off said at least one power cell.

6. A centrifuge according to claim 1, further comprising a speed determining device coupled to said logic control module.

7. A centrifuge according to claim 6, wherein said speed determining device comprises a tachometer.

8. A centrifuge according to claim 7, wherein said tachometer further comprises a magnetic pickup positioned to sense the speed and direction of a toothed gear mounted on a shaft of said motor.

9. A centrifuge according to claim 8, wherein said magnetic pickup is mounted on said motor.

10. A centrifuge according to claim 7, wherein said tachometer sends speed control data to a tachometer control unit, said tachometer control unit sending information to said logic control module.

11. A centrifuge according to claim 10, wherein said speed control data is transmitted as a pulsed speed signal.

12. A centrifuge according to claim 1, wherein said motor controller controls the speed of rotation of said basket by selectively turning on and off said at least one power cell.

13. A centrifuge according to claim 1, wherein said first contactor comprises a mechanical contactor.

14. A centrifuge according to claim 1, wherein said motor controller further comprises a second contactor coupling said at least one power cell to said motor, said second contactor switchable between a first state wherein an electrical connection is made between said at least one power cell and said motor, and a second state wherein an electrical connection is broken between said at least one power cell and said motor, said second contactor arranged such that, when said voltage is applied to said motor through said second contactor, the rotation of said motor is opposite the rotation of said motor when said voltage is applied to said motor through said first contactor.

15. A centrifuge according to claim 14, wherein said logic control module turns off said voltage at said at least one power cell prior to switching either said first or second contactors.

16. A centrifuge according to claim 1, further comprising a second contactor coupling said at least one power cell to said motor, said second contactor switchable between a first state wherein an electrical connection is made between said at least one power cell and said motor, and a second state wherein an electrical connection is broken between said at least one power cell and said motor wherein said motor comprises high speed windings and low speed windings, said first contactor connected to said low speed windings and said second contactor connected to said high speed windings.

17. A centrifuge according to claim 1, further comprising voltage suppression device.

18. A centrifuge according to claim 17, wherein said voltage suppression device comprises at least one varistor.

19. A centrifuge according to claim 17, wherein said voltage suppression device is arranged between said main power supply and said at least one power cells.

20. A centrifuge according to claim 1, wherein said motor controller integrates with a programmable logic control module programmed to control the cycling of said centrifuge.

21. A motor controller for a centrifuge machine comprising:

a first power cell having an input coupled to a main power supply and an output, wherein said first power cell is switchable between an on state where power is supplied to said output, and an off state where no power is supplied to said output;

a first contactor connected between the output of said first power cell and first windings of a motor, said first contactor switchable between a first state, wherein an electrical connection is made between said first power cell and said motor, and a second state wherein an electrical connection is broken between said first power cell and said motor; and, a logic control module coupled to both said first power cell and said first contactor, said logic control module arranged to interface with the controls of said centrifuge machine, said first contactor and said first power cell to selectively apply power to said motor at least during acceleration operations of said motor.

22. A motor controller for a centrifuge machine according to claim 21, further comprising second and third power cells, wherein said power supply comprises a three phase power supply and each of said first, second and third power cells couple a respective phase of said three phase power supply to said first contactor.

23. A motor controller for a centrifuge machine according to claim 21, wherein said first power cell comprises two silicone controlled rectifiers.

24. A motor controller for a centrifuge machine according to claim 23, wherein said logic control module controls the amount of power said first power cell supplies to said motor by varying the rate at which said logic control module switches said first power cell between said on and off states.

25. A motor controller for a centrifuge machine according to claim 21, further comprising:

a second contactor connected between said first power cell and second windings of said motor, said second contactor switchable between a first state, wherein an electrical connection is made between said first power cell and said motor, and a second state wherein an electrical connection is broken between said first power cell and said motor, said second contactor further coupled to said logic control module, wherein said logic control module is further arranged to control said first and second contactors to selectively supply power to a select one of said first and second windings of said motor.

26. A motor controller for a centrifuge machine according to claim 25, wherein said first windings are low speed windings, said second windings are high speed windings.

27. A motor controller for a centrifuge machine according to claim 25, wherein said logic control module switches said first power cell to said off state prior to switching either said first or second contactors.

28. A motor controller for a centrifuge machine according to claim 21, further comprising:

a second contactor connected between said first power cell and said first windings of said motor, said second contactor switchable between a first state, wherein an electrical connection is made between said first power cell and said motor, and a second state wherein an electrical connection is broken between said first power cell and said motor, said second contactor further coupled to said logic control module, wherein said second contactor is arranged to supply power to said motor such that said motor rotates in a direction opposite of the direction said motor rotates when powered through said first contactor.

29. A motor controller for a centrifuge machine according to claim 21, wherein said logic control module supplies power through said first power cell to said motor during acceleration operations of said motor, and said main power supply does not supply power to said motor through said first power cell during full speed operations of said motor.

30. A motor controller for a centrifuge machine according to claim 21, wherein said logic control module supplies power to said motor while said motor is rotating at a speed less than the maximum rated speed of said motor.

31. A motor controller for a centrifuge machine according to claim 21, further comprising a speed determinative device connected to a first input of said logic control module.

32. A motor controller for a centrifuge machine according to claim 31, wherein said speed determinative device comprises a tachometer.

33. A motor controller for a centrifuge machine according to claim 31, wherein said logic control module is programmable to maintain the rotation speed of said motor to within a speed band range during at least a portion of a load cycle.

34. A motor controller for a centrifuge machine according to claim 21, wherein said first contactor comprises a mechanical contactor.

35. A motor controller for a centrifuge machine according to claim 21, further comprising a voltage suppression device arranged to prevent voltage spikes from reaching said first power cell.

36. A motor controller for a centrifuge machine according to claim 35, wherein said voltage suppression device comprises a varistor.

37. A motor controller for a centrifuge machine according to claim 21, further comprising a current sensing device connected to said logic control module.

38. A motor controller for controlling a three phase, 2-speed AC motor, comprising:

three power cells, each of said three power cells connected to a different one phase of a three phase power supply;

a first contactor connected between each of said three power cells and first windings of said 2-speed AC motor, said first contactor switchable between a first state wherein an electrical connection is made between said at three power cells and said $^{2}$-speed AC motor, and a second state wherein an electrical connection is broken between said three power cells and said 2-speed AC motor, said first contactor arranged to bias said 2-speed AC motor to operate in a first direction;

a second contactor connected between each of said three power cells and said first windings of said 2-speed AC motor, said second contactor switchable between a first state wherein an electrical connection is made between said at three power cells and said 2-speed AC motor, and a second state wherein an electrical connection is broken between said three power cells and said 2-speed AC motor, said second contactor arranged to bias said 2-speed AC motor to operate in a second direction;

a third contactor connected between each of said three power cells and second windings of said 2-speed AC motor, said third contactor switchable between a first state wherein an electrical connection is made between said at three power cells and said 2-speed AC motor, and a second state wherein an electrical connection is broken between said three power cells and said 2-speed AC motor, said third contactor arranged to bias said 2-speed AC motor to operate in said first direction;

a logic control module connected to said three power cells and said first, second and third contactors, said logic control module arranged to control said three power cells to control the amount of power said three power cells supply to said motor, said logic control module further arranged to control said contactors to selectively control the speed and direction of said motor; and, a speed determining device coupled to said logic control module, said speed determining device arranged to provide data concerning the rotational speed of said 2-speed AC motor to said logic control module.

39. A motor controller for controlling a three phase, 2-speed AC motor according to claim 38, further comprising a fourth contactor in series between said first and second contactors, and said motor, said fourth contactor coupled to said logic controller and arranged to tie said first windings of said motor together when said third contactor is in a first state and power is supplied to said second windings through said third contactor.

* * * * *

UNITED STATES PATENT AND TRADEMARK OFFICE

CERTIFICATE OF CORRECTION

PATENT NO. : 6,507,161 B2
DATED : January 14, 2003
INVENTOR(S) : Roger Glen Fair It is certified that error appears in the above-identified patent and that said Letters Patent is hereby corrected as shown below:

Column 3,
Line 37, reads "the second contactor" should read -- the third contactor --
Line 37, reads "contactor coupled" should read -- contactor is coupled --
Line 58, reads "loading, it the" should read -- loading, the --

Column 4,
Line 15, reads "between the at power" should read -- between the power --
Line 21, reads "associated one phase" should read -- associated phase --
Lines 40, 42, 51 and 53 reads "between the at least" should read -- between at least --

Column 5,
Line 1, reads "different one phase" should read -- different phase --
Lines 7 and 14, reads "between the at three" should read -- between the three --
Line 22, reads "between the at" should read -- between the --
Line 51, reads "invention; and," should read -- invention; --

Column 7,
Line 35, reads "may removed" should read -- may be removed --
Line 39, reads "period 1." should read -- period I. --

Column 8,
Line 11, reads "as speed" should read -- as the speed --

Column 10,
Line 14, reads "damage to the" should read -- damage the --

Column 11,
Line 4, reads "148 and the" should read -- 148. The --
Line 5, reads "and further obtains" should read -- further obtain --

UNITED STATES PATENT AND TRADEMARK OFFICE

CERTIFICATE OF CORRECTION

PATENT NO. : 6,507,161 B2

DATED : January 14, 2003

INVENTOR(S) : Roger Glen Fair

It is certified that error appears in the above-identified patent and that said Letters Patent is hereby corrected as shown below:

Column 12,
Line 12, reads “motor,” should read -- motor; --

Column 15,
Line 5, reads “$^{2}$-speed” should read -- 2-speed --

Signed and Sealed this

Twenty-third Day of September, 2003

JAMES E. ROGAN

*Director of the United States Patent and Trademark Office*